Nov. 5, 1957    G. L. WEBB    2,812,395
DIRECTIONAL SIGNAL MOUNTING PLATE ASSEMBLY
Filed June 19, 1953    3 Sheets-Sheet 1
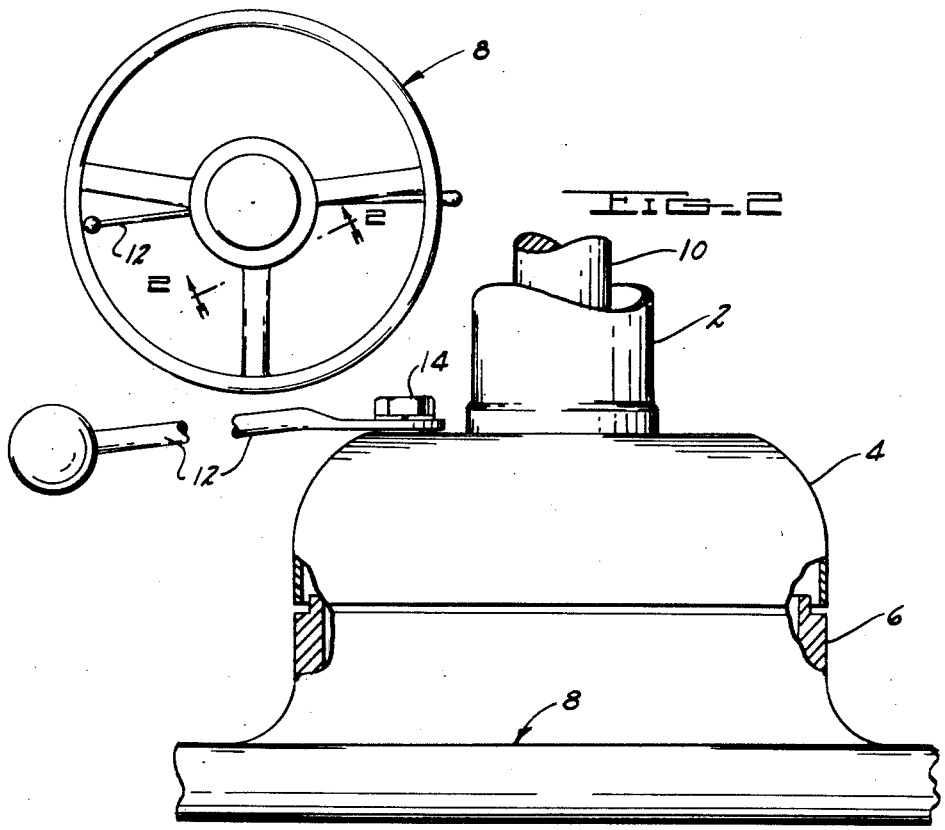
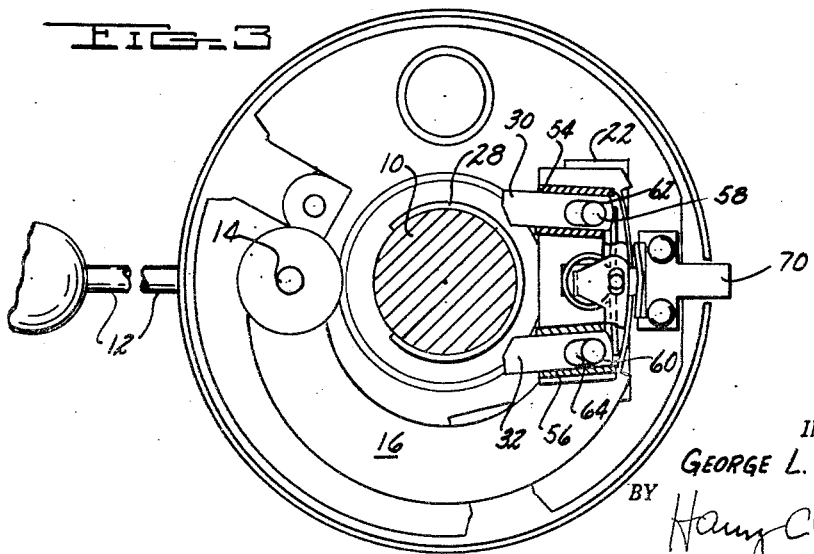
INVENTOR.
GEORGE L. WEBB
BY
ATTORNEY Nov. 5, 1957 G. L. WEBB 2,812,395
DIRECTIONAL SIGNAL MOUNTING PLATE ASSEMBLY
Filed June 19, 1953 3 Sheets-Sheet 2

INVENTOR.
GEORGE L. WEBB
BY
ATTORNEY

Nov. 5, 1957  G. L. WEBB  2,812,395
DIRECTIONAL SIGNAL MOUNTING PLATE ASSEMBLY
Filed June 19, 1953  3 Sheets-Sheet 3
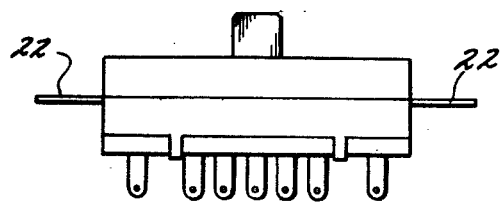
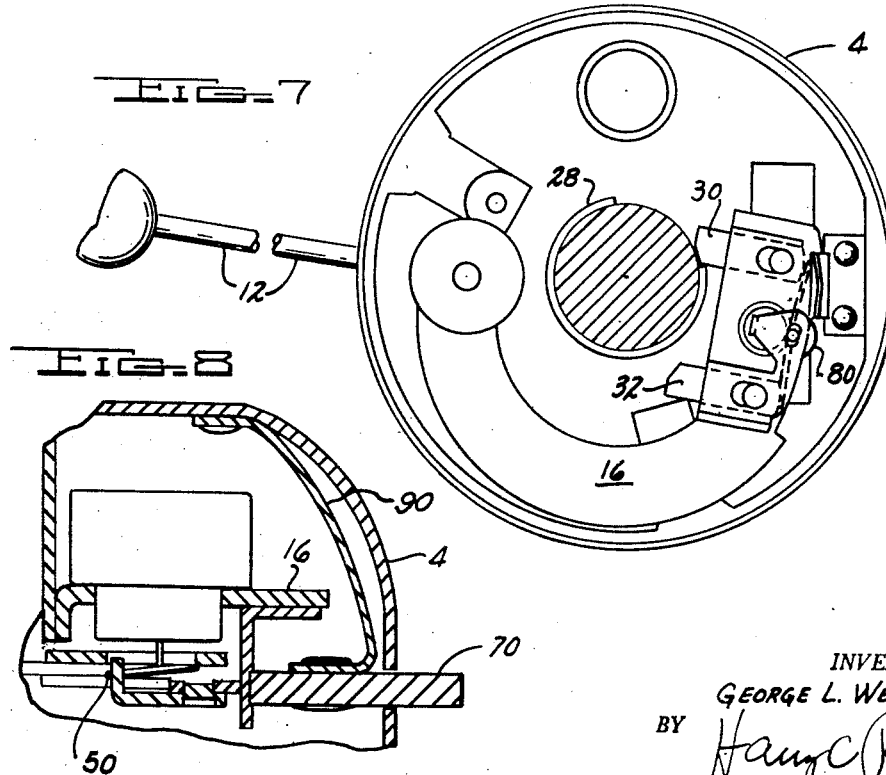
INVENTOR.
GEORGE L. WEBB
BY
ATTORNEYS United States Patent Office 2,812,395
Patented Nov. 5, 1957

2,812,395

DIRECTIONAL SIGNAL MOUNTING PLATE ASSEMBLY

George L. Webb, Logansport, Ind., assignor to Essex Wire Corporation

Application June 19, 1953, Serial No. 362,919

6 Claims. (Cl. 200—61.34)

My present invention relates to vehicular directional turn indicators, and more particularly to an improved construction for actuation of turn signals and for automatic cancelation of turn signals upon execution of an indicated turn.

The energization of a turn signal is usually accomplished by manual actuation of a switching assembly. The cancelation of a turn signal is accomplished automatically after execution of an indicated turn by mechanical canceling means. The canceling means is usually operatively associated with the steering shaft of the vehicle so that when the turn is completed and the operator reverses the steering wheel in the normal operation of straightening the wheels, a suitable mechanism is engaged to cancel the turn signal previously energized. A mounting plate attached to the steering column supports the actuating and canceling means as well as the circuit selector switch.

Turn signal assemblies previously available have been objectionable because they frequently cancel prematurely. The ordinary construction of previously available assemblies balances one spring force against another. In this type of construction one spring force tends to hold the switch in the energized position and an opposed counterbalancing spring force tends to move the switch into canceling position. Slight jarring of the assembly either by the turning of the steering column or because of rough roads upsets the balance of the opposing forces causing premature cancelation. Merely increasing the resistance to cancelation is an unsatisfactcory answer because this in turn increases the danger of jamming the steering mechanism.

My present invention provides a cock and uncock type of selector means as opposed to the aforementioned balancing of forces which avoids premature cancelation and complicated construction.

It is therefore a principal object of this invention to provide a turn selector means for a directional signal device which avoids any premature canceling of the turn signals.

It is a further object to provide a turn selector wherein all parts contacting the steering column are yieldable and resilient thereby minimizing the possibility of jamming of the steering mechanism.

A further object of my invention is to provide a direction signalling device of the manually set and automatically cancel type which is simple in construction and especially adapted to mass production.

Other objects of this invention will appear in the following description and appended claims, reference being had to the accompanying drawings forming a part of this specification.

In the drawings:

Fig. 1 is a plan view of a vehicle steering wheel construction embodying the directional signal assembly of the present invention.

Fig. 2 is a view partially in section taken along the line 2—2 in the direction of the arrows, Fig. 1.

Fig. 3 is a plan view of a directional signal mounting plate assembly embodying the present invention, the steering shaft and finger carriers being broken away.

Fig. 6 is a front elevation of a circuit selector switch.

Fig. 7 is a plan view of another species of the invention showing the turn signal assembly positioned to energize a turn signal.

Fig. 8 is a fragmentary side elevation in section.

Before explaining the present invention in detail, it is to be understood that the invention is not limited in its application to the details of the construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to Fig. 2 of the drawings, 2 indicates the steering column of a vehicle. A steering shaft 10 is rotatably mounted within the column 2. A rounded housing 4 is affixed to the upper end of the steering column 2, and the hub 6 of the steering wheel 8 is disposed adjacent the housing 4 to form a hollow shell which contains the mechanism of the present invention.

Figure 5:
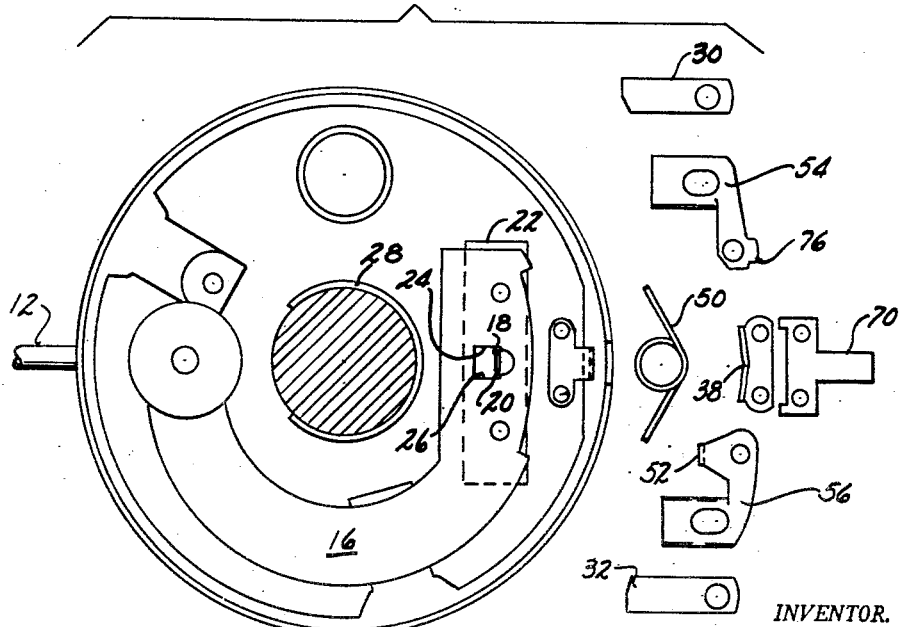
Fig. 5 is an exploded plan view, the component parts of the signal selector means being shown separately.

The turn signal assembly is shown in Fig. 3. This assembly is mounted on the housing 4 immediately beneath the steering wheel of the vehicle so that the turn signal lever 12 is easily accessible to the operator of the motor vehicle. Movement of the lever 12 in a clockwise direction causes energization of the indicator lights that indicate a right hand turn is to be made. Similarly counterclockwise movement of lever 12 indicates a left hand turn. The lever 12 is operatively joined by the pin 14 to the arm 16. Lever 12 and arm 16 therefore move synchronously. A blanked out portion 18 of the arm 16 (Fig. 5) receives the post 20 of a contact carrying member of a circuit selector switch 22. Manual operation of lever 12 therefore causes lateral displacement of the yieldable post 20 as a result of the engagement of the edges 24 and 26 of the blanked out portion 18 with the post 20. Displacement of the contact carrying post 20 serves to selectively energize the turn signal circuits.

As shown in Fig. 3, the turn signal is in the non-operating position. The steering column 10 and the canceling cam 28 clear the fingers 30 and 32 held by the finger carriers 54 and 56 so that when the turn signal is not in use there is no part of the assembly in contact with the steering column. It is also to be noted that the free ends of the fingers 30 and 32 diverge when the turn signal is in the non-operating position providing additional clearance between the steering column and the assembly.

Figure 4:
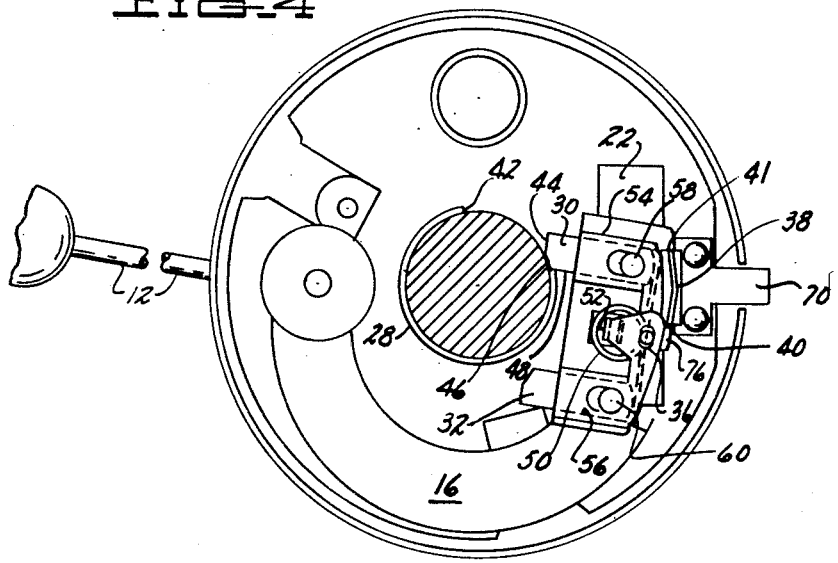
Fig. 4 is a plan view of the mounting plate assembly of Fig. 3 showing the component parts of the assembly positioned to energize a turn signal.

In Fig. 4, the assembly is shown in operating position. The lever 12 has been moved in a clockwise direction, energizing the indicator lights which signal a right turn. The following is a detailed description of how the lights are kept energized until canceled.

Movement of the lever 12 in the clockwise direction causes concurrent movement of the pivot arm 16. The dog 76 integral with the finger carrier 54 follows the detent 38 to the outer edge thereof, and as the dog 76 passes beyond the edge of the detent track it is forced in an outwardly direction for cocking engagement with the detent 38 by the force exerted by the hairspring 50. The ends of the spring 50 are constrained by the fingers 30 and 32. The turn of the spring 50 is engaged with an integrally normal lug 52 of the finger carrier 56, and forces the ends of the finger carriers 54 and 56 joined by the pin 36 in a radially outward direction. The shoulder 41 on the pivot arm 16 engages the opposite end of the detent track 38 and limits the travel of the assembly. A pushbutton canceling means is provided at 70 because the flat engagement of the dog 76 with the edge of the detent track 38 prevents manual cancelation of a signal. As shown in Fig. 4, for example, if the operator manually sets the indicator for a right hand turn and then changes his mind, the depression of the pushbutton 70 causes the leg 40 to advance thereby forcing the dog 76 out of engagement with the edge of the detent track 38 and the assembly returns to the non-operating position due to the force exerted by the switch post 20 due to internal switch spring action. Fig. 8 shows the spring support 90 of pushbutton 70 which allows the pushbutton to advance for disengaging of the dog 76.

In addition to cocking the assembly, the pivotal movement of the arm 16 causes the finger 30 which is positioned by the finger carrier 54 to move into the peripheral path of the canceling cam 28. The finger 30 advances still further into the peripheral path of the canceling cam at the moment the dog 76 engages the edge of the detent because the outward movement of the dog causes the free ends of the fingers 30 and 32 to converge. As the dog 76 advances into the cocked position, the finger carrier ends joined by the pin 36 follow along causing the finger carriers to rotate respectively about the pins 58 and 60 causing the free ends of the finger carriers and fingers to converge.

In executing the right hand turn, the steering shaft 10 moves in a clockwise direction. The cam-face 42 strikes against the face 44 of the yieldable finger 30 and the finger recedes a short distance into the finger carrier 54. As the clockwise motion of the column 10 continues, the finger 30 rides idlingly on the outer peripheral surface of the cam 28, advancing radially inwardly when positioned opposite the recess formed by the cam faces 42 and 46 of the cam 28.

When the right hand turn is completed, the rotation of the steering shaft 10 will be reversed in the normal operation of straightening the wheels. The finger 30 will extend into the recess in the cam 28 when positioned opposite thereto, as described above, and continued counter-clockwise movement of the steering shaft 10, as in straightening the wheels, will cause the cam-face 46 to butt against the side 48 of the finger 30. The cam will force the finger 30 and the finger carrier 54 containing the dog 76 to rotate about the pin 58 thereby causing the dog 76 to become disengaged from the detent 38. The tangential force applied to the arm 16 by the impinging blow of the cam face 46 against finger 30 plus the force exerted by the yieldable post 20 against the edge 24 of the pivot arm 16 forces the assembly to the non-operating position shown in Fig. 3.

The yieldability and freedom of motion of the fingers 30 and 32 is achieved by the use of the slots 62 and 64 and in providing for arcuate movement of the fingers about the pins 58 and 60. The slots 62 and 64 allow the fingers to recede into the finger carriers and the pressure exerted by the ends of the spring 50 against the fingers keeps them in the normally extended position.

In addition to yielding in the straight line manner prescribed by the slots 62 and 64, the fingers 30 and 32 yield arcuately about the pins 58 and 60. The pins 58 and 60 join the fingers 30 and 32 and finger carriers 54 and 56 to the pivot arm 16. The pin 36 holds only the finger carriers 54 and 56. Thus, the fingers and finger carriers can move arcuately about the pins 58 and 60 in clockwise and counter-clockwise directions. The yieldability of the fingers 30 and 32 is exemplified by the fact that when a finger is disposed in the peripheral path of cam 28 as in Fig. 4, the finger assembly can be forceably held in the engaged position by holding the lever 12, and the steering wheel can be reversed without jamming.

The finger 30 will yield easily to the cam 28 and move arcuately in the counter-clockwise manner about the pin 58. Thus, in effect, in every instance where there is bearing contact between the mounting plate assembly and the steering shaft, the bearing member is yieldable, thereby minimizing the possibility of jamming the steering mechanism.

Fig. 7 is another specie of the present invention. The purpose of this specie is to eliminate the manual canceling mechanism 70 which is required with the basic cock and uncock mechanism. It is possible in the case of the specie indicated in Fig. 7 to move the actuating lever 12 into the operating position and to pull it out of the operating position in the event of a signalling error and still make use of the basic cock and uncock principle. In the case of the specie of Fig. 3, the pushbutton 70 must be used to cancel a signal given in error.

In this specie, the dog 76 is replaced with the roller 80. The roller 80 is rotatably mounted on the pin 36, joining the finger carriers 54 and 56, and extends outwardly of the arm 16. Upon actuation of the assembly by manual movement of the lever arm 12, the roller 80 rolls on the detent 38 and becomes engaged in a cocked manner with the edge thereof. As in the case of the basic construction the outward and engaging movement of the roller 80 is due to the pressure of the spring 50. In Fig. 7, pressure on the lever arm 12 will cause the roller to roll around the edge of the detent 38 and so allow canceling of a signal mistakenly given. Where there is flat engagement as in the case of Fig. 3 where the dog 76 is cocked against the edge of the detent 38, increased pressure on the lever 12 serves only to press the dog more firmly against the edge of the detent.

Having thus described my invention I claim:

1. A turn signal switch adapted for mounting on a vehicle steering shaft having a canceling cam extending partially therearound, comprising a manually operated lever, a pivot arm connected to and actuated by said lever, an electrical switch in yielding engagement with said pivot arm, detent means adapted to hold said pivot arm engaged in the position selected by the lever, yieldable canceling fingers normally clearing the canceling cam and pivotally mounted so that the free ends thereof diverge when the pivot arm is in the non-actuated position and converge when the pivot arm is actuated, said fingers being further adapted for alternate yielding engagement with said canceling cam upon an associated actuation of the pivot arm and rotation of the steering shaft, and said fingers adapted to disengage the pivot arm and detent means upon a reversal of direction of the steering shaft and canceling cam.

2. A turn signal switch as defined in claim 1 in which said detent means to hold said pivot arm engaged in the position selected by the lever arm and in which means to mount said fingers constitute: spaced shoulders adjacent the end of said pivot arm not connected to said lever, a roller pivotably disposed on said pivot arm between said shoulders, a detent disposed adjacent said pivot arm, a pair of finger carriers mounted on said pivot arm for limited rotatable movement, said fingers disposed one in each of said finger carriers and movable longitudinally thereof, a spring engaging the outer ends of said fingers and also engaging said finger carriers to put said fingers and roller under spring tension, the movement of said lever to an operative position moving one of said fingers into the path of the cam on said steering shaft and placing said detent between said roller and one of the shoulders on said pivot arm, rotation of the steering shaft in the direction of the turn moving the finger into the finger carrier against spring tension, and rotation of the steering shaft counter to the turn engaging the cam with the side of said finger to move the assembly to the neutral position.

3. In a turn signal switch adapted for mounting adjacent the steering shaft of a vehicle a lever, a pivot arm connected to and actuated by said lever, an electrical switch in yieldable engagement with said pivot arm, a detent mounted adjacent said pivot arm, selector means including spaced shoulders on said pivot arm, a projecting element centrally located between said shoulders, the movement of said lever to an operative position thereby locating the ends of the detent between one of said shoulders and the projecting element, said projecting element engaging the detent in a cocking manner for positive engagement.

4. A turn signal switch as defined in claim 3 in which said projecting element is a roller.

5. A turn signal switch as defined in claim 1 in which said detent means to hold said pivot arm engaged in the position selected by the lever and in which means to mount said fingers constitute: spaced shoulders adjacent the end of said pivot arm not connected to said lever, a dog disposed on said pivot arm between said shoulders, a detent disposed adjacent said pivot arm, a pair of finger carriers mounted on said pivot arm for limited rotatable movement, said fingers disposed one in each of said finger carriers and movable longitudinally thereof, a spring engaging the outer ends of said fingers and also engaging said finger carriers to put said fingers and dog under spring tension, the movement of said lever to an operative position moving one of said fingers into the path of the cam on said steering shaft and placing said detent between said dog and one of the shoulders on said pivot arm, rotation of the steering shaft in the direction of the turn moving the finger into the finger carrier against spring tension, and rotation of the steering shaft counter to the turn engaging the cam with the side of said finger to move the assembly to the neutral position, and canceling means to manually cancel a signal mistakenly given.

6. A turn signal switch as defined in claim 3 in which said projecting element is a dog and in which canceling means are provided for manual cancellation of a signal mistakenly given.

References Cited in the file of this patent

UNITED STATES PATENTS

| | | |
|---|---|---|
| 2,070,454 | Rushing | Feb. 9, 1937 |
| 2,249,137 | Hill | July 15, 1941 |
| 2,276,413 | Moore | Mar. 17, 1942 |
| 2,343,355 | Yanchenko et al. | Mar. 7, 1944 |
| 2,427,595 | Fuller | Sept. 16, 1947 |
| 2,525,033 | Hollins | Oct. 10, 1950 |
| 2,596,834 | Barcus | May 13, 1952 |
| 2,600,030 | Stube | June 10, 1952 |
| 2,602,849 | Lawson et al. | July 8, 1952 |
| 2,643,308 | Lincoln et al. | June 23, 1953 |
| 2,657,287 | Lincoln et al. | Oct. 27, 1953 |
| 2,678,358 | Thomson | May 11, 1954 |
| 2,690,483 | Elliott et al. | Sept. 28, 1954 |
| 2,702,327 | Redick | Feb. 15, 1955 |
| 2,728,825 | Lincoln et al. | Dec. 27, 1955 |
| 2,733,309 | Elliott | Jan. 31, 1956 |
| 2,739,196 | Spicer | Mar. 20, 1956 |
| 2,739,197 | Lingenbrink | Mar. 20, 1956 |